(12) United States Patent
Komura et al.

(10) Patent No.: US 6,242,119 B1
(45) Date of Patent: Jun. 5, 2001

(54) FUEL CELL SYSTEM AND DRAINING METHOD FOR THE SAME

(75) Inventors: Takashi Komura, Saitama-ken; Takashi Moriya; Shoji Isobe, both of Utsunomiya; Toshiharu Ushiro, Kawagoe, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/344,518

(22) Filed: Jun. 25, 1999

(30) Foreign Application Priority Data

Jul. 2, 1998 (JP) .................................. 10-187891

(51) Int. Cl.$^7$ ................................................ H01M 8/06
(52) U.S. Cl. ................................ 429/17; 429/20; 429/22
(58) Field of Search ................................ 429/17, 20, 22

(56) References Cited

U.S. PATENT DOCUMENTS

| | | | |
|---|---|---|---|
| 4,585,708 | * | 4/1986 | Abens et al. ............................ 429/17 |
| 4,670,359 | * | 6/1987 | Beshty et al. .......................... 429/17 |
| 5,837,393 | * | 11/1998 | Okamoto ................................. 429/20 |
| 6,063,515 | * | 5/2000 | Epp et al. ............................... 429/17 |
| 6,068,941 | * | 5/2000 | Fuller et al. ........................ 429/17 X |
| 6,083,637 | * | 7/2000 | Walz et al. ............................. 429/17 |

FOREIGN PATENT DOCUMENTS

| | | | |
|---|---|---|---|
| 08091804 | 4/1996 | (JP) . | |
| 8-91804 | 4/1996 | (JP) . | |
| 10223249A | 8/1998 | (JP) | .............................. H01M/8/06 |

OTHER PUBLICATIONS

English Translation of Abstract of Publication No. 102232249–A, Aug. 21, 1998.

* cited by examiner

*Primary Examiner*—Stephen Kalafut
(74) *Attorney, Agent, or Firm*—Lahive & Cockfield, LLP

(57) ABSTRACT

Disclosed is a fuel cell system and a draining method for the same based on the use of a reformer, a fuel cell, a methanol tank for storing methanol, a water recovery tank for storing water discharged, for example, from the fuel cell, an aqueous methanol solution tank for mixing methanol and water, and a changeover valve connected under the water recovery tank and capable of draining all of water contained in the water recovery tank and a water passage. Accordingly, no water remains and freezes in the fuel cell system when the system is stopped. It is possible to reliably start the system, and it is possible to improve the reliability.

10 Claims, 2 Drawing Sheets

FUEL CELL SYSTEM AND DRAINING METHOD FOR THE SAME

BACKGROUND OF THE INVENTION

1. Field of the Invention

The present invention relates to a fuel cell system and a draining method for the same, based on the use of a reformer for producing a reformed gas containing hydrogen gas from a liquid mixture of methanol and water to supply the reformed gas to a fuel cell comprising an anode electrode and a cathode electrode provided opposingly with an electrolyte interposed therebetween.

2. Description of the Related Art

A fuel cell stack has been developed, which comprises, for example, a plurality of stacked fuel cells interposed by separators, the fuel cell including an anode electrode and a cathode electrode provided opposingly with a solid polymer electrolyte membrane interposed therebetween. Such a fuel cell stack has been practically used for a variety of applications.

The fuel cell stack of the type as described above is constructed as follows. That is, for example, an aqueous methanol solution is reformed with steam to produce a reformed gas (fuel gas) containing hydrogen gas which is supplied to the anode electrode, while an oxygen-containing gas (air or oxygen gas) is supplied to the cathode electrode. Thus, the hydrogen gas is ionized, and it flows through the solid polymer electrolyte membrane. Accordingly, the electric energy is obtained at the outside of the fuel cell.

In the case of the vehicle-carried type fuel cell stack, it is difficult to replenish the aqueous methanol solution, for example, especially for passenger cars which are not aimed to run on a regular route. For this reason, it is practical to use a system in which only methanol is replenished, and water produced by the reaction in the fuel cell stack is recovered and utilized as necessary water. However, it is feared that the water necessary for the reforming may be frozen when the fuel cell stack is used in the cold climates, because of the provision of a water tank having a relatively large capacity. A problem arises in that it is difficult to start up the fuel cell stack smoothly.

An apparatus for supplying the raw material liquid is known, for example, as disclosed in Japanese Laid-Open Patent Publication No. 8-91804. The apparatus comprises a methanol storage tank for storing methanol; a storage tank for storing reforming raw material liquid arranged under the methanol storage tank and connected with a supply passage for water discharged from a fuel cell, for storing a liquid mixture of methanol and water; and an inflow amount-adjusting means arranged between the methanol storage tank and the storage tank for storing reforming raw material liquid, for adjusting the inflow amount of methanol fed from the methanol storage tank to the storage tank for storing reforming raw material liquid to obtain a predetermined value of the mixing ratio of methanol and water in the storage tank for storing reforming raw material liquid.

In the case of the conventional technique described above, it is possible to avoid the freezing because no water tank is used. However, the water, which remains in the water supply passage for connecting the fuel cell and the storage tank for storing reforming raw material liquid, tends to freeze. Therefore, a problem is pointed out in that the supply passage may be closed thereby.

Further, the reforming reaction for the aqueous methanol solution is represented by $CH_3OH + H_2O \rightarrow 3H_2 + CO_2$, while the reaction in the fuel cell is represented by $3H_2 + CO_2 + 3/2 O_2 \rightarrow 3H_2O + CO_2$. In view of this fact, the water necessary to change 1 mol of methanol to hydrogen is theoretically 1 mol, while the produced water discharged from the fuel cell is 3 mols. Therefore, an excessive amount of produced water is introduced into the reforming raw material storage tank. A problem arises concerning the handling of water which is excessive with respect to the mixing ratio of methanol and water.

SUMMARY OF THE INVENTION

A principal object of the present invention is to provide a fuel cell system especially appropriate to be carried on vehicles and a draining method for the same, in which water is reliably prevented from freezing in the system, and excessive water is easily processed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
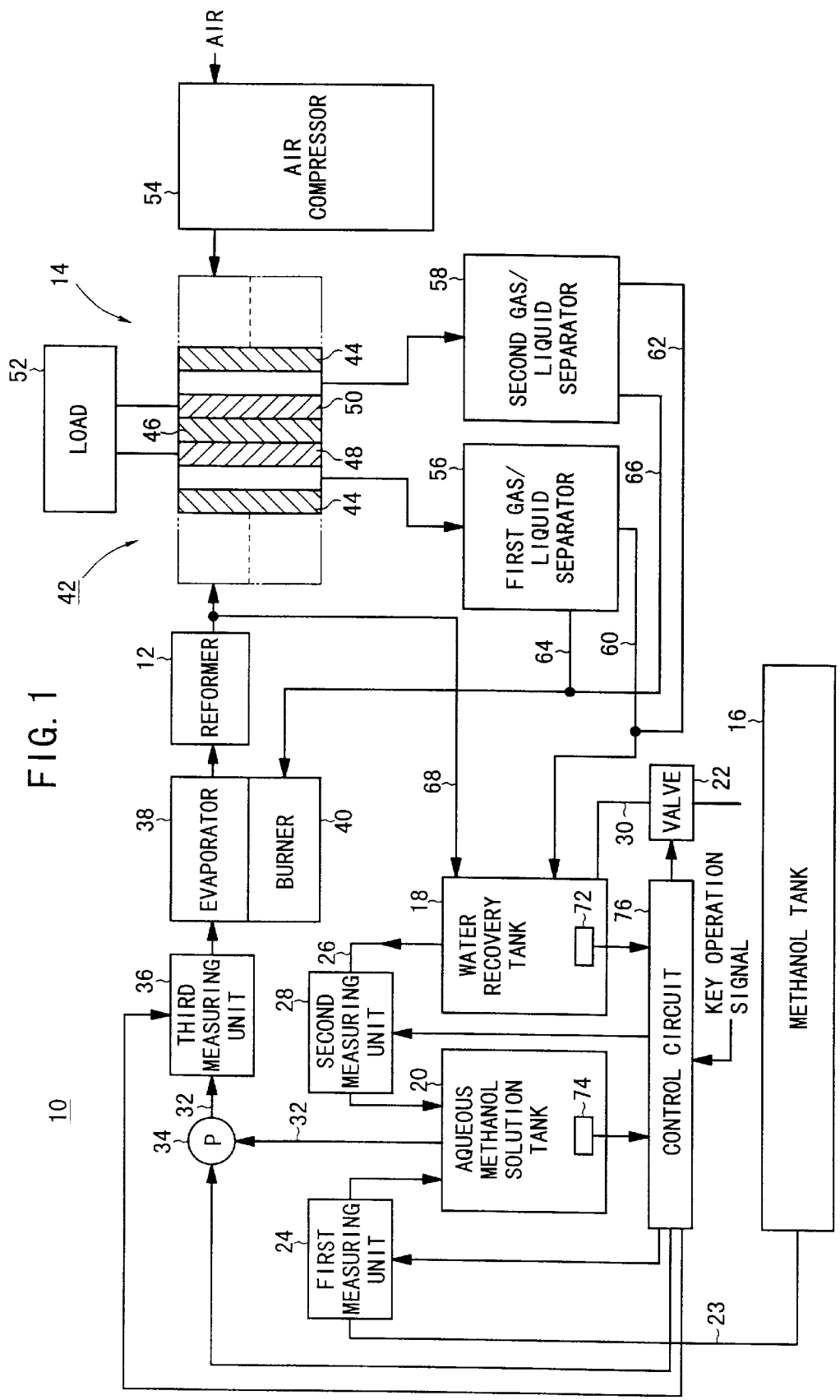
FIG. 1 shows a schematic arrangement of a fuel cell system according to an embodiment of the present invention.

FIG. 1 shows a schematic arrangement of a fuel cell system 10 of the vehicle-carried type according to an embodiment of the present invention. The fuel cell system 10 comprises a reformer 12 for producing a reformed gas containing hydrogen gas from a liquid mixture of methanol ($CH_3OH$) and water, a fuel cell 14 for being supplied with the reformed gas as a fuel gas from the reformer 12, a methanol tank 16 for storing methanol, a water recovery tank 18 for storing at least water discharged from the fuel cell 14, an aqueous methanol solution tank 20 for being supplied with methanol and water after being measured from the methanol tank 16 and the water recovery tank 18 respectively, and for supplying the liquid mixture to the reformer 12, and a changeover valve 22 connected under the water recovery tank 18, the changeover valve 22 being capable of draining all of water contained in the water recovery tank 18 and water passages (as described later on).

The methanol tank 16 is designed to have a relatively large capacity. A methanol passage 23 is provided to extend from the methanol tank 16 to the aqueous methanol solution tank 20. A first measuring unit 24 for supplying a predetermined amount of methanol is arranged at an intermediate position of the methanol passage 23.

A first water passage 26 is provided to extend from the water recovery tank 18 to the aqueous methanol solution tank 20. A second measuring unit 28 is arranged at an intermediate position of the first water passage 26. Each of the water recovery tank 1B and the aqueous methanol solution tank 20 is designed to have a considerably small capacity as compared with the methanol tank 16. Specifically, the aqueous methanol solution tank 20 is designed to have a capacity capable of storing the liquid mixture of an amount necessary to start the water supply to the aqueous methanol solution tank 20 after recovering, into the empty water recovery tank 18, the water discharged from at least the fuel cell 14 after the start-up of the fuel cell system 10. The changeover valve 22 is connected under the water recovery tank 18 via a drain passage 30.

A fuel passage 32 is provided for the aqueous methanol solution tank 20. The liquid mixture in the aqueous methanol solution tank 20 is supplied to a third measuring unit 36 via a pump 34 arranged in the fuel passage 32. A vaporizer 38 is connected on the outlet side of the third measuring unit 36. The combustion heat is supplied to the vaporizer 38 from a burner 40. A fuel cell stack 42 is connected on the outlet side of the vaporizer 38 via the reformer 12. The fuel cell stack 42 comprises a plurality of fuel cells 14 and a plurality of separators 44 which are alternately stacked with each other. The fuel cell 14 includes a solid polymer electrolyte membrane 46, and a hydrogen-side electrode (anode electrode) 48 and an air-side electrode (cathode electrode) 50 which are. provided opposingly with the solid polymer electrolyte membrane 46 interposed therebetween. The anode 48 and the cathode 50 are connected to a load 52 such as an electric motor.

Those connected to the fuel cell stack 42 include an air compressor 54 for supplying the atmospheric air (oxygen-containing gas) to the cathode 50, and first and second gas/liquid separators 56, 58 for making separation into gas and water from the discharge components discharged from the fuel cell stack 42. The first and second gas/liquid separators 56, 58 are provided with second and third water passages 60, 62 for supplying the separated water to the water recovery tank 18, and first and second gas passages 64, 66 for supplying the separated gas to the burner 40.

A fourth water passage 68 for supplying water to the water recovery tank 18 is connected on the outlet side of the reformer 12. First and second liquid level meters 72, 74 for detecting the liquid level height of water and liquid mixture are provided in the water recovery tank 18 and the aqueous methanol solution tank 20 respectively. The first and second liquid level meters 72, 74 are connected to a control circuit 76. The control circuit 76 operates and controls the changeover valve 22 and the pump 34, and it controls the first to third measuring units 24, 28, 36. A start signal and a stop signal for the fuel cell system 10 are inputted into the control circuit 76 in accordance with the operation of an unillustrated system start/stop switch.

The operation of the fuel cell system 10 constructed as described above will be explained below in relation to the draining method therefor.

At first, when the system is started, the inside of the aqueous methanol solution tank 20 is in a state of being filled with methanol and water. The liquid mixture (fuel) is supplied to the third measuring unit 36 disposed in the fuel passage 32 in accordance with the action of the pump 34. A predetermined amount of liquid mixture is supplied to the vaporizer 38. The liquid mixture is vaporized by the vaporizer 38, and it is fed to the reformer 12 to perform the reforming. Accordingly, the reformed gas (fuel gas), which contains hydrogen gas and carbon dioxide gas, is obtained. The reformed gas is supplied to the respective anodes 48 of the fuel cell stack 42. On the other hand, the atmospheric air (oxygen-containing gas) is introduced into the respective cathodes 50 of the fuel cell stack 42 from the air compressor 54.

Therefore, in each of the fuel cells 14, the hydrogen contained in the reformed gas is ionized (into hydrogen ion), and it flows through the solid polymer electrolyte membrane 46 toward the cathode 50. The hydrogen ion reacts with oxygen and electron on the cathode 50 to produce water. The electron provides the electric energy for driving the load 52. On the other hand, the discharge components discharged from the anode 48 and the discharge components (containing the produced water) discharged from the cathode 50 are introduced into the first and second gas/liquid separators 56, 58.

The water is recovered by the first and second gas/liquid separators 56, 58, and it is supplied to the water recovery tank 18 via the second and third water passages 60, 62 respectively. The gas components such as unreacted hydrogen gas and carbon dioxide gas, which are separated by the first gas/liquid separator 56, are led to the burner 40 via the first gas passage 64. On the other hand, the gas components such as unreacted oxygen gas and nitrogen gas, which are separated by the second gas/liquid separator 58, are led to the burner 40 via the second gas passage 66. The water, which is discharged from the reformer 12, is supplied to the water recovery tank 18 via the fourth water passage 68.

Next, when the first liquid level meter 72 detects the fact that the water level in the water recovery tank 18 is at a predetermined liquid level height, the second liquid level meter 74 subsequently detects the liquid level height in the aqueous methanol solution tank 20. If the liquid level of the liquid mixture in the aqueous methanol solution tank 20 is not more than a predetermined height, the first and second measuring units 24, 28 are operated in accordance with the action of the control circuit 76. Methanol and water are supplied at a predetermined mixing ratio to the aqueous methanol solution tank 20 from the methanol tank 16 and the water recovery tank 18 respectively.

On the other hand, if the liquid level of the liquid mixture in the aqueous methanol solution tank 20 is not less than the predetermined height, then the changeover valve 22 is opened, and the water in the water recovery tank 18 is discharged to the outside via the drain passage 30. When the liquid level in the water recovery tank 18 is not more than a predetermined height, the changeover valve 22 is closed.

Figure 2:
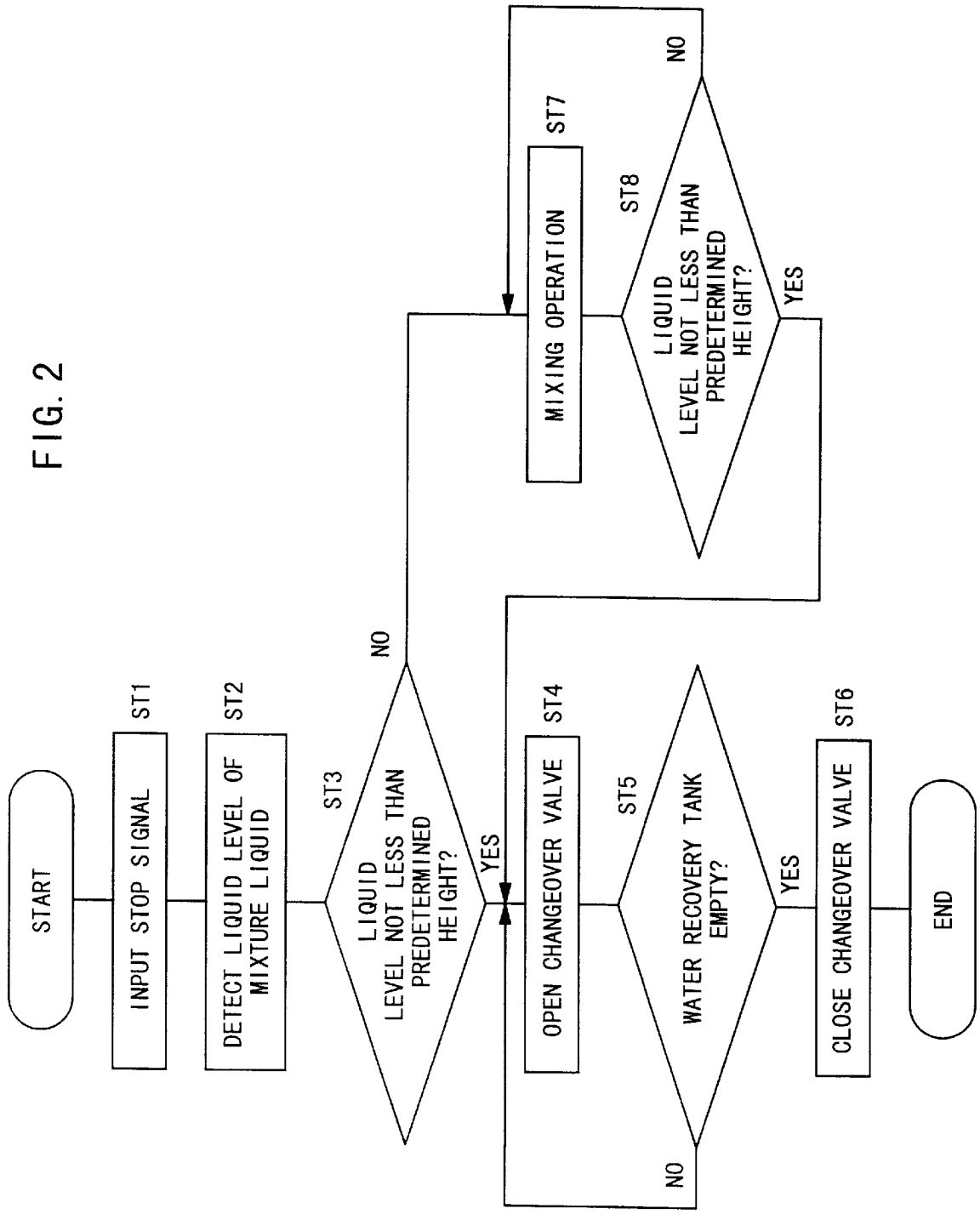
FIG. 2 illustrates a flow chart for explaining a draining method according to the present invention.

Subsequently, when an operation stop signal for the fuel cell system 10, for example, a stop signal from the unillustrated system start/stop switch is inputted into the control circuit 76, the draining process is started on the basis of a flow chart shown in FIG. 2. That is, when the operation stop signal is inputted (step ST1), the liquid level height of the liquid mixture in the aqueous methanol solution tank 20 is detected (step ST2).

If the liquid level of the liquid mixture is not less than a predetermined height (YES in the step ST3), the routine proceeds to the step ST4 to open the changeover valve 22. Accordingly, the water, which is stored in the water recovery tank 18, is discharged through the drain passage 30. After the water recovery tank 18 is empty (YES in the step ST5), the changeover valve 22 is closed (step ST6).

On the other hand, if the liquid level in the aqueous methanol solution tank 20 is lower than the predetermined height, the routine proceeds to the step ST7 to perform the operation for mixing methanol and water. Specifically, the first and second measuring units 24, 28 are operated, and the methanol in the methanol tank 16 and the water in the water recovery tank 18 are supplied at a predetermined mixing ratio into the aqueous methanol solution tank 20 respectively. If the liquid level of the liquid mixture in the aqueous methanol solution tank 20 is not less than the predetermined height (YES in the step ST8), the routine proceeds to the step ST4 and. the followings to discharge all of the water in the water recovery tank 18 and the first to fourth water passages 26, 60, 62, 68.

As described above, according to the embodiment of the present invention, no water remains in the fuel cell system 10 during the period in which the operation of the fuel cell system 10 is stopped. Water does not freeze, for example, in the first to fourth water passages 26, 60, 62, 68. The closure of the tube due to the freezing can be avoided as effectively as possible. Therefore, the fuel cell system 10 can be reliably started especially in the cold climates. An effect is obtained such that it is possible to effectively improve the reliability of the fuel cell system 10.

Further, the capacity of the aqueous methanol solution tank 20 is made as small as possible. It is possible to miniaturize the entire fuel cell system 10, and it is possible to allow the methanol tank 16 to have a large capacity. Therefore, the long distance running is achieved without any necessity for the frequent replenishment of methanol. Thus, it is possible to improve the convenience of use.

Furthermore, if the liquid level position of the aqueous methanol solution tank 20 is higher than the predetermined position during the operation of the fuel cell system 10, or if the liquid level height in the water recovery tank 18 is higher than the predetermined position, then the excessive water can be drained easily and quickly by opening the changeover valve 22.

The first to fourth water passages 26, 60, 62, 68 are connected to the water recovery tank 18. However, it is sufficient that at least the water, which is discharged from the air-side electrode 50 as the cathode, is supplied to the water recovery tank 18. It is allowable that only the third water passage 62 is connected to the water recovery tank 18.

The water in the fourth water passage 68 contains hydrogen gas. Therefore, the fourth water passage 68 is normally used for draining without recovering when the water is collected therein.

The fuel cell system and the draining method for the same according to the present invention are based on the use of the methanol tank for storing methanol, the water recovery tank for storing water discharged, for example, from the fuel cell, the aqueous methanol solution tank for mixing methanol and water to obtain the liquid mixture, and the draining changeover valve connected under the water recovery tank. All of the water contained in the water recovery tank and the water passages can be drained only by opening the changeover valve when the operation of the fuel cell system is stopped. Accordingly, the occurrence of freezing can be avoided during the period of operation stop. When any excessive water is produced in the fuel cell system, the excessive water can be drained easily and quickly only by opening the changeover valve.

What is claimed is:

1. A fuel cell system provided with a reformer for producing reformed gas containing hydrogen gas from a liquid mixture of methanol and water, in which said reformed gas is supplied to a fuel cell including an anode electrode and a cathode electrode provided opposingly with an electrolyte interposed therebetween, said fuel cell system comprising:

a methanol tank for storing methanol;

a water recovery tank for storing water discharged from at least said fuel cell;

an aqueous methanol solution tank for being supplied with methanol and water after being measured from said methanol tank and said water recovery tank respectively, and supplying said liquid mixture of methanol and water to said reformer; and a changeover valve connected under said water recovery tank, capable of draining all of the water contained in said water recovery tank and in at least one water passage coupled to one of said water recovery tank, said methanol tank, and said reformer.

2. The fuel cell system according to claim 1, further comprising a control circuit for opening said changeover valve when a system stop signal is inputted from a system start/stop switch.

3. The fuel cell system according to claim 1, wherein said aqueous methanol solution tank is designed to have a capacity capable of storing said liquid mixture in an amount necessary to start water supply to said aqueous methanol solution tank by recovering, into said empty water recovery tank, water discharged from at least said fuel cell after start-up.

4. The fuel cell system according to claim 1, wherein a liquid level meter for detecting a liquid level height of said liquid mixture is provided in said aqueous methanol solution tank.

5. The fuel cell system according to claim 1, wherein a liquid level meter for detecting a liquid level height of water is provided in said water recovery tank.

6. The fuel cell system according to claim 1, wherein first and second measuring units for measuring and supplying methanol and water are provided for said methanol tank and said water recovery tank respectively.

7. A draining method for a fuel cell system provided with a reformer for producing reformed gas containing hydrogen gas from a liquid mixture of methanol and water, in which said reformed gas is supplied to a fuel cell including an anode electrode and a cathode electrode provided opposingly with an electrolyte interposed therebetween, said draining method comprising the steps of:

measuring methanol stored in a methanol tank to supply it to an aqueous methanol solution tank, and measuring water stored in a water recovery tank after being discharged from at least said fuel cell, and supplying water to said aqueous methanol solution tank to obtain said liquid mixture of methanol and water;

supplying said liquid mixture of methanol and water from said aqueous methanol solution tank to said reformer to produce said reformed gas;

adjusting said aqueous methanol solution tank to be in a designed state of being filled with water after operation of said fuel cell system is stopped; and opening a changeover valve connected under said water recovery tank when said aqueous methanol solution tank is in said state of being filled with methanol and water so that all of the water contained in said water recovery tank and at least one water passage coupled to one of said water recovery tank, said methanol solution tank, and said reformer is drained.

8. The draining method for said fuel cell system according to claim 7, further comprising the step of signaling a start and a stop of said fuel cell system operation by inputting signals into a control circuit from a system start/stop switch.

9. The draining method for said fuel cell system according to claim 7, further comprising the step of draining excessive water by opening said changeover valve when a liquid level position of said aqueous methanol solution tank is not less than a predetermined height.

10. The draining method for said fuel cell system according to claim 7, further comprising the step of draining excessive water by opening said changeover valve when a liquid level of said water recovery tank is not less than a predetermined height.

* * * * *